(Model.)
G. D. HAWORTH.
Reel for Check Line for Corn Planter.
No. 236,024. Patented Dec. 28, 1880.
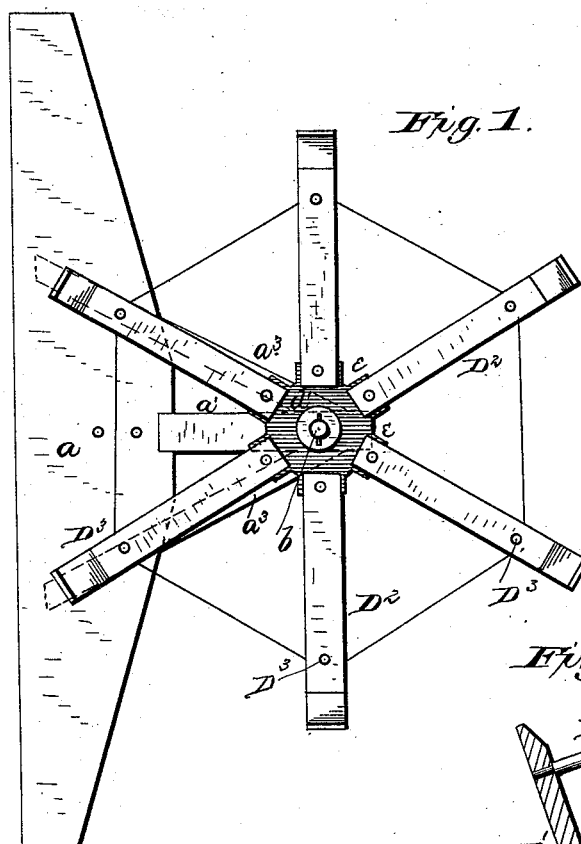
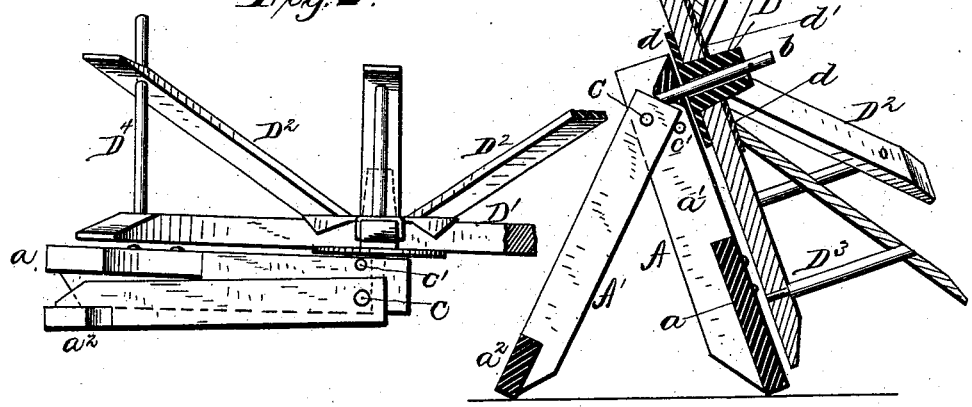
Witnesses.
Franck L. Ouraud
N. B. Smith
Inventor.
Geo. D. Haworth
by Aill, Smith & Co
Attorneys

UNITED STATES PATENT OFFICE.

GEORGE D. HAWORTH, OF DECATUR, ILLINOIS.

REEL FOR CHECK-LINES FOR CORN-PLANTERS.

SPECIFICATION forming part of Letters Patent No. 236,024, dated December 28, 1880.

Application filed October 7, 1880. (Model.)

*To all whom it may concern:*

Be it known that I, GEORGE D. HAWORTH, of Decatur, county of Macon, State of Illinois, have invented certain new and useful Improvements in Reels for Check-Lines for Corn-Planters, of which the following is a full, clear, and exact description, reference being had to the accompanying drawings, making part of this specification, in which—

Figure 1 is a plan view of the reel with the stand folded for transportation or for paying out the check-line. Fig. 2 is a side elevation of the same; and Fig. 3 is a vertical section through the reel and stand in working position for reeling in the check-line.

My invention relates to a novel construction of reels for check-lines used in connection with check-row corn-planters, and of the folding stand or frame for supporting the same, whereby lightness, strength, and durability are secured, together with compactness of the parts when folded for transportation or storing; and it consists, first, in making the radial arms of the reel in pairs converging to and united in a common central hub, and with one of the ribs projected to form the crank or handle for operating the reel, as hereinafter described.

It further consists in making the supporting-stand in two parts, in triangular or equivalent bracing form, hinged together at their upper ends or apexes, near the reel-pivot, whereby they may be spread apart or opened to form a broad base for the support of the reel when in use, or folded together for packing or transportation, as hereinafter described.

In the accompanying drawings, the reel-stand (indicated by letters A A') is composed of two parts or frames, one of which, A, is shown as consisting of a base-plate or bar, $a$, made broad midway of its length, and tapering thence on its inner side or face to the ends, leaving the outer edge straight, as shown in Fig. 1; and to this bar or base-plate, midway of its length, is rigidly secured a supporting bar or standard, $a'$, to which, near its outer or upper end, the reel-pivot $b$ is secured in any suitable manner. The frame A' is composed also of a base-plate or bar, $a^2$, and two bars, $a^3 a^3$, rigidly secured thereto, with their projecting ends converging toward the bar $a'$, and connected with the end of said bar, on opposite sides, by a through-bolt or pivot, C. By this construction the bar $a'$ is adapted to fold between the bars $a^3 a^3$, for bringing the two frames composing the reel-stand into the folded position shown in Fig. 2, giving it a compact form for storing or transportation, and also the position in which it is best adapted to paying out the check-line for use in the field, said line, by preference, moving out over the base-plate or bar $a$, which prevents undue sagging of the line or wire and the cramping or binding of the reel on its pivot. In reeling in the wire the frame or stand A A' is opened, and assumes a position resembling the letter V inverted in side elevation or section, (shown in Fig. 3,) a stop at $g'$ serving to limit the spreading of the frame, as required.

The reel is composed of a single central hub, D, provided with a flange or flanges, and of radial arms D' D², secured to said hub in pairs, which diverge therefrom and are united at their outer ends by ribs or rods D³, as shown. The flanges or flange and disk $d\ d'$ on the hub are provided on their inner adjacent faces with radial ribs or lips $e$, forming sockets in which the radial arms D' are secured, and the arms D², diverging therefrom, are secured to the outer face of the flange or disk $d'$ by means of bolts or rivets, which pass also through the inner ends of the arms D'. By thus uniting the diverging arms to each other and to a common central hub in pairs a bracing form is given to the structure, and a light but strong and substantial construction of reel is secured. The ribs D³ are, by preference, formed from metal rods, as being best adapted for use with the wire check-line in common use, as giving the desired strength with less bulk of material than would otherwise be necessary, and one of these (shown at D⁴, Fig. 2) is extended beyond the rib D², and forms a convenient crank or handle for operating the reel in winding up the check-line. In reeling in the check-line the reel stands in the inclined position shown in Fig. 3, that having in practice been found to be most favorable to that operation; but in paying out the check-line the stand is folded up and the reel placed in the horizontal position shown in Fig. 2, as above explained, said line being less liable to get caught or entangled when the reel is in that position.

Having described my invention, I claim as an improvement in reels for check-lines—

1. The folding reel-stand composed of the two frames pivoted together at their upper ends, in combination with the reel-pivot projecting laterally from one of said frames and supporting the reel mounted thereon either in an inclined or in a horizontal position, substantially as described.

2. A reel for check-lines, consisting of the single hub having the radial and diverging arms connected with it arranged in pairs, and projected at their outer ends beyond the connecting-ribs which form the body or cylinder on which the check-line is supported, substantially as shown and described.

3. The reel composed of the central hub, D, the diverging arms D' D², and the connecting-ribs D³, one of which is extended to form the crank or handle for operating the reel, substantially as described.

GEORGE D. HAWORTH.

Witnesses:
THEO. COLEMAN,
JAMES W. HAWORTH.